Jan. 16, 1951  J. J. DAVIS  2,538,672
SHAFT SEAL
Filed June 25, 1946

INVENTOR.
John J. Davis,
BY Victor J. Evans & Co.
ATTORNEYS

Patented Jan. 16, 1951

2,538,672

UNITED STATES PATENT OFFICE 2,538,672

SHAFT SEAL

John J. Davis, Lacombe, La.

Application June 25, 1946, Serial No. 679,169

1 Claim. (Cl. 308—187.1)

The invention relates to a gland assembly and more especially to a shaft seal device.

The primary object of the invention is the provision of a device of this character, wherein fluid cannot pass from one side of the sealing medium to the other side thereof, irrespective of the motion to a shaft intersecting the seal, the latter being of novel construction and is unique in the assembly thereof, as it will withstand high pressure and assures flexibility to the said shaft in the working thereof.

Another object of the invention is the provision of a device of this character, wherein the construction thereof is adapted for service in refrigeration plants, pumping systems, particularly where the pump of a pressure type is to be hermetically sealed inside a system with the power unit exteriorly thereof, thus enabling repairs and replacement of parts to the latter, as it would be accessible in this outside location.

A further object of the invention is the provision of a device of this character, which is simple in construction, thoroughly reliable and effective as a seal for a moving part, strong, durable, inherently flexible, possessed of few parts, thus economical in repairs and replacements and inexpensive to manufacture and install.

With these and other objects in view the invention consists in the features of construction, combination and arrangement of parts as will be hereinafter more fully described, illustrated in the accompanying drawings, which disclose the preferred and modified forms of construction thereof, and pointed out in the claim hereunto appended.

In the accompanying drawings.

Similar reference characters indicate corresponding parts throughout the several views in the drawings.

Figure 1:
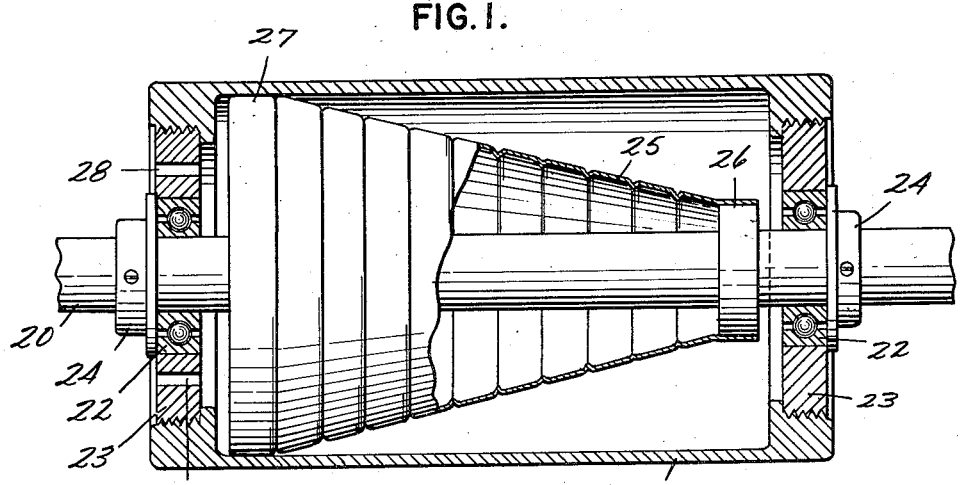
Figure 1 is a fragmentary vertical sectional view through a shaft seal constructed in accordance with the invention.
Figure 2:
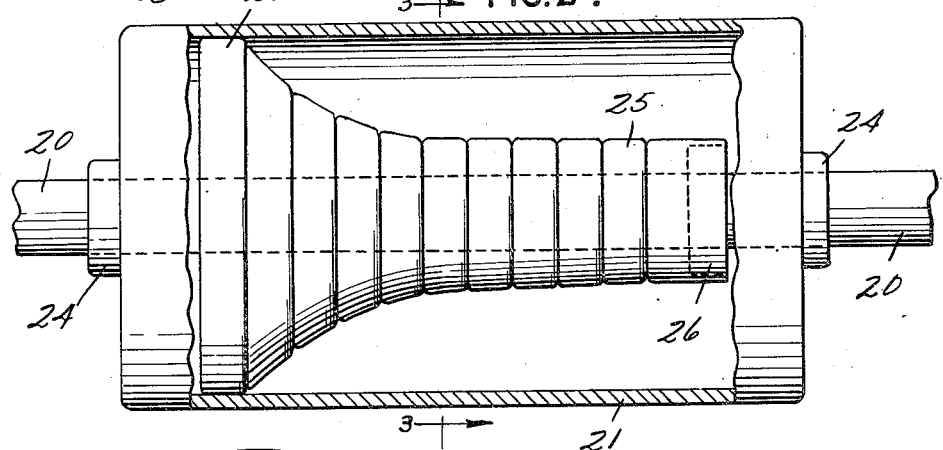
Figure 2 is a side view, partly broken away, and looking toward the seal at substantially right angles to the position thereof in Figure 1.
Figure 3:
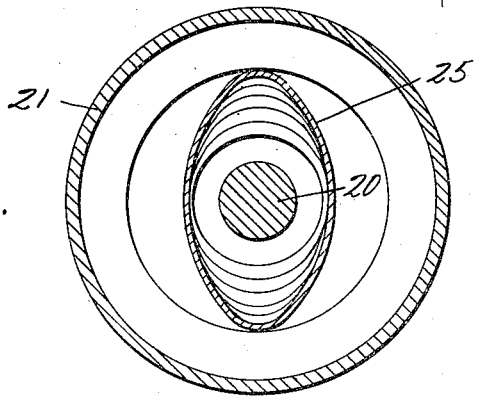
Figure 3 is a sectional view taken on the line 3—3 of Figure 2.

Referring to the drawings in detail, there is illustrated the seal device constituting the invention, wherein a rotatable power shaft, a portion of which is denoted at 20, is housed within a cylindrical casing 21 forming a sealing gland for a pumping apparatus, not shown. The power shaft 20 is to be extended to a power unit, also not shown, exteriorly with relation to such pumping apparatus, so that access may be had directly to the power unit from outside the pumping apparatus.

The shaft 20 is supported in bearing cages 22 which are detachably fitted in end heads 23 of the casing 21, which are also detachably applied to the latter at opposite ends thereof, these cages 22 being centrally located in the said heads 23.

The shaft 20 outside of the heads 23 has carried thereby end thrust collars 24, which are located next to the said heads, while within the cylindrical casing 21 and embracing said shaft is a substantially oval-shaped, tapering, pliable, sleeve-like, fluted or corrugated sealing membrane 25, which at the smaller end 26 is hermetically closed against the shaft 20 and fixed thereto entirely about the same, while the larger end 27 of this membrane 25 is affixed to the inner surface of the casing 21, next to the head 23 adjacent thereto. The smaller end 26 is located next to the other head 23 adjacent thereto, and in this manner it is impossible for the escape of fluid under pressure gaining entrance to the casing 21 through the bearings for the shaft 20 from passing the membrane 25 and thus avoiding leakage at the gland involving the assembly as before described.

The gland having the casing 21 is disposed with relation to a pressure chamber not shown, to have the larger end 27 of the membrane 25 outermost thereto with the casing extending outwardly of this chamber, as the head 23 at this outer end is provided with lubricating holes 28 for lubricating purposes.

The shaft 20 in the mounting in the gland does not make a complete revolution, as it is intended for imparting an oscillating stroke action to the pumping apparatus, as may be operated from a power unit, not shown, the membrane flexing under this motion for absorbing the same without interference to the working of the shaft.

The membrane 25 effects a complete fluid seal between the shaft 20 and the casing 21, so that under the working of the shaft there can be no leakage of fluid through the gland from the apparatus to the exterior thereof, as should be obvious, the power unit for the operation of the apparatus being outside of the same and in this manner such unit is readily accessible.

What is claimed is:

In combination, a tubular casing, spaced anti-friction bearings mounted in opposite ends of said casing, an oscillating power shaft extending through said casing and rotatably supported by said anti-friction bearings, thrust collars secured to said shaft outside said casing and abutting said anti-friction bearings whereby said shaft is held against axial movement, and a pliable sealing sleeve within said casing and surrounding said shaft between said bearings, said sealing sleeve having annular end members of different predetermined diameters, respectively, one said annular end member being hermetically sealed to said casing, the other said annular member being hermetically sealed on said shaft, said sealing sleeve between said annular members having a substantially oval-shaped cross section substantially throughout the length of said sleeve and progressively decreasing from the annular member attached to said casing to the annular member on said shaft, a series of grooves in and equally spaced along said sealing sleeve and extending about the same in planes perpendicular to the axis of said shaft whereby said sealing sleeve effects a complete fluid seal preventing leakage of fluid along said shaft between said bearings.

JOHN J. DAVIS.

REFERENCES CITED

The following references are of record in the file of this patent:

UNITED STATES PATENTS

| Number | Name | Date |
|---|---|---|
| 1,148,227 | Heeley | July 27, 1915 |
| 2,102,797 | Helmer | Dec. 21, 1937 |
| 2,421,841 | Lowry | June 10, 1947 |
| 2,432,803 | Rice | Dec. 16, 1947 |

FOREIGN PATENTS

| Number | Country | Date |
|---|---|---|
| 15,172 | Great Britain | 1912 |